(12) United States Patent
Piazza et al.

(10) Patent No.: US 7,941,708 B2
(45) Date of Patent: May 10, 2011

(54) ERROR MANAGEMENT FRAMEWORK

(75) Inventors: Charles Piazza, Sanford, FL (US);
Rodney Bratcher, Clermont, FL (US);
Adhir Chobe, Port Orange, FL (US)

(73) Assignee: Masco Contractor Services LLC, Daytona Beach, FL (US)

( * ) Notice: Subject to any disclaimer, the term of this patent is extended or adjusted under 35 U.S.C. 154(b) by 344 days.

(21) Appl. No.: 12/119,577

(22) Filed: May 13, 2008

(65) Prior Publication Data

US 2009/0287950 A1 Nov. 19, 2009

(51) Int. Cl.
*G06F 11/00* (2006.01)
(52) U.S. Cl. .......................... 714/48; 714/57
(58) Field of Classification Search .............. 714/48, 714/57
See application file for complete search history.

(56) References Cited

U.S. PATENT DOCUMENTS

| | | | | |
|---|---|---|---|---|
| 6,145,101 | A * | 11/2000 | Pike | 714/46 |
| 6,510,350 | B1 * | 1/2003 | Steen et al. | 700/9 |
| 6,944,659 | B2 * | 9/2005 | Taggart et al. | 709/224 |
| 7,062,681 | B2 * | 6/2006 | Larsson et al. | 714/39 |
| 7,171,651 | B1 * | 1/2007 | Greenberg et al. | 717/120 |
| 7,269,763 | B2 * | 9/2007 | Maehara | 714/48 |
| 2005/0038832 | A1 * | 2/2005 | Feigenbaum | 707/202 |
| 2006/0156077 | A1 * | 7/2006 | Altaf et al. | 714/57 |
| 2007/0074074 | A1 * | 3/2007 | Curtis et al. | 714/25 |
| 2007/0180335 | A1 * | 8/2007 | Greenberg et al. | 714/46 |
| 2008/0097789 | A1 * | 4/2008 | Huffer | 705/2 |
| 2008/0172583 | A1 * | 7/2008 | Mahajan et al. | 714/57 |
| 2009/0013208 | A1 * | 1/2009 | DiMuzio | 714/2 |
| 2009/0158099 | A1 * | 6/2009 | Cui | 714/57 |

* cited by examiner

*Primary Examiner* — Robert Beausoliel
*Assistant Examiner* — Charles Ehne
(74) *Attorney, Agent, or Firm* — Carlson, Gaskey & Olds, P.C.

(57) ABSTRACT

A system and method for computer error management initially detects an error and creates an error report. The error report is then sent to a server where it is hosted on the World Wide Web. The server additionally notifies designated users of the error and can allow the users to correct the error.

9 Claims, 1 Drawing Sheet

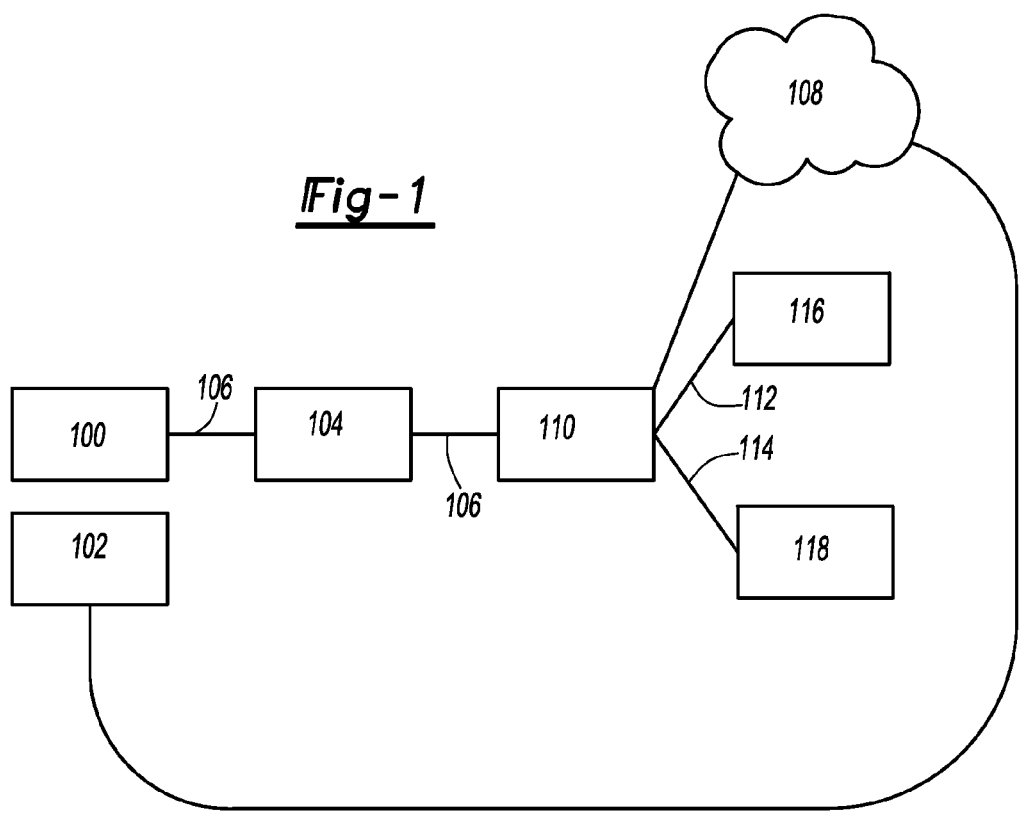
Fig-1
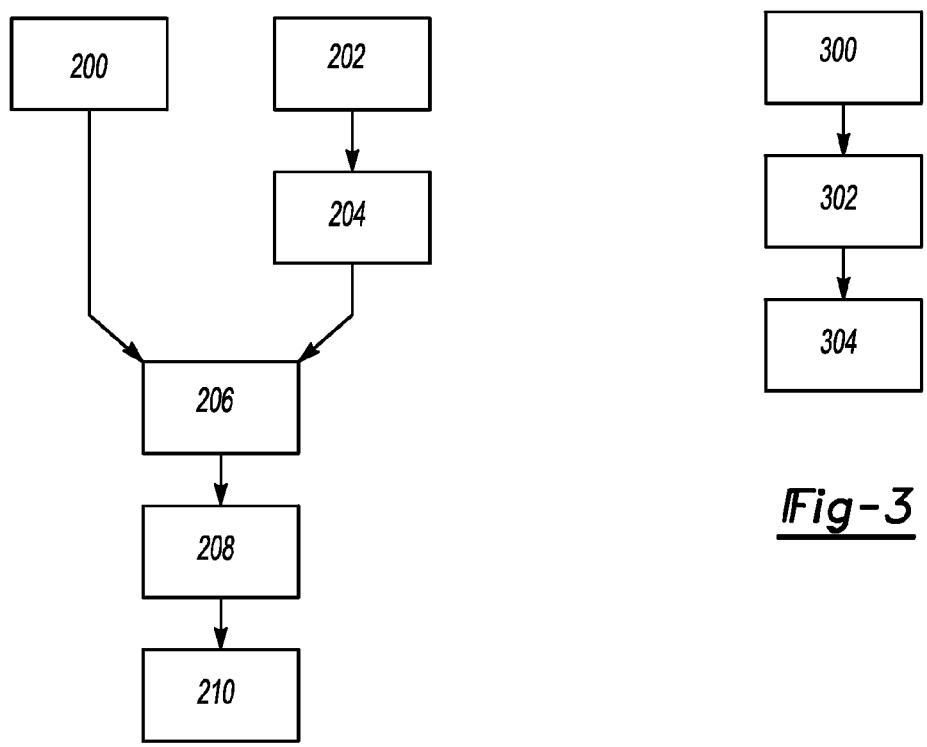
Fig-2
Fig-3

ERROR MANAGEMENT FRAMEWORK

BACKGROUND OF THE INVENTION

The present application is directed towards a computer error management system and method.

Within the field of contracting services it is often desirable to convert large electronic databases from older file formats into new file formats that can be more easily utilized by state of the art computer programs. The most common method used to convert databases is to utilize a custom program that can read each entry in the database and transcribe it to a format that can be used by the state of the art programs. Ideally, such a program could be initiated and then left to run until all of the data has been converted. With the current state of the art it is apparent that errors will occur during the conversion process that could require immediate attention.

A first type of error that can occur is a runtime error. A runtime error occurs when there is an error resulting from the program itself. Runtime errors can cause a number of negative effects such as corruption of a data file, missing or incorrect data, or a shutdown of the program. When a runtime error occurs, a user who is knowledgeable about the program's operation should be notified so that they can correct the error, restart the program or take any other appropriate action. In order to facilitate this it is desirable to provide an automated detection and notification system for runtime errors.

A second type of error that can occur is a data error. Data errors can be the result of an improper entry in a source database, corruption in a file, errors in conversion, runtime errors, or other unanticipated problems. When a data error occurs it is desirable to inform a user who knows what the correct data should be, or who has access to that information. Once the appropriate user is informed about a data error he can access the original system and make any necessary corrections to ensure that the data is correct. Currently there is no way to allow a user to make those corrections using the same system as the notification system.

SUMMARY OF THE INVENTION

The applicant has devised a system and method for detecting and reporting errors. After detecting an error the source system sends information about the error to a first server. The first server then creates an error report and forewords the error report to a second server which prepares the error report for use with a web portal. The second server notifies designated users of the error and provides access to the error report via the web portal.

These and other features of the present invention can be best understood from the following specification and drawings, the following of which is a brief description.

BRIEF DESCRIPTION OF THE DRAWINGS

FIG. 1 illustrates a physical system for an embodiment of the invention.

FIG. 2 is a flowchart illustrating a method for an embodiment of the invention.

FIG. 3 is a flowchart illustrating a continuation of the method for a second embodiment of the invention.

DETAILED DESCRIPTION OF AN EMBODIMENT

FIG. 1 illustrates one possible physical system on which an error notification and management method can operate. A computer 100 is connected via an internal network 106 to a first server 104. A second computer 102 is connected via a World Wide Web connection 108 to a second server 110. The first server 104 and the second server 110 are connected via the internal network 106. The second server 110 is capable of forming a connection 112 with a phone system 116, or a connection 114 with a third computer 118.

FIG. 2 illustrates a flowchart for an embodiment of the error management system. Initially an error is detected in one of the computers 100, 102 using any known error detection method. After the error is detected in one of the computers 100, 102 the error management system startup step 200, 202 takes place. In the system startup step 200, if the error occurred on the computer 100, the computer 100 sends information relating to the error to the first server 104 over the internal network 106. Alternatively, if the error occurred on the second computer 102, the system startup step 202 occurs and the error information is processed and sent to the intermediate startup step 204.

In the intermediate startup step 204 information relating to the error is formatted for transmittal over the World Wide Web 108. The second computer 102 connects to the World Wide Web 108 and the error information is then sent to the second server 110. Once the second server 110 receives the information via the World Wide Web 108 it passes the information on to the first server 104.

Once the first server 104 has received the information it begins the error report creation step 206. In the error report creation step 206 the first server 104 creates an error report. After the error report has been created the first server 104 formats the error report in a standardized error report format. An error code is then assigned to the error report. The error code assigned is dependant on what type of error occurred (runtime error, data error, unknown error, etc.). The error report, along with the error code, is then transmitted via the internal network 106 to the second server 110.

Once the error report is transmitted to the second server 110, the user notification step 208 begins. In the user notification step 208 the second server 110 compares the error code associated with the error report to a list of users and notifies designated users. The notification may occur via email, voicemail, SMS messaging or any other known method of notification. The list of users contains at least one user designated to each possible error code, and a single user may be designated to more than one error code. The user notification step 208 additionally formats the error report for use with a web portal. Once the error report is formatted for the web portal it is hosted on the World Wide Web and can be accessed by any of the notified users through the web portal.

Once the user has been notified the program moves into the user corrections step 210. The user corrections step 210 allows the user to log in through the web portal, read the error report, and make any necessary corrections. Additionally available in the user corrections step 210 is the possibility for a user to flag the error. If the user flags the error the first and second servers 104 and 110 recognize that the error has been viewed and therefore do not send notifications of the same error multiple times.

For certain types of errors, or errors occurring on certain machines it is possible to include steps which would allow the user to modify the database or correct the errors using the same web portal interface that is used to view the error reports. FIG. 3 illustrates a flowchart for the steps that would occur in one such embodiment. After a user has accessed the error report in the user corrections step 210 he may begin the initial data correction step 300. In the initial data correction step 300 the user enters corrections to the data using a data corrections form provided through the same web portal used to view the error report. Once all the necessary corrections have been made and the user submits the corrections, the form is transmitted to the second server 110 and the intermediate corrections step 302 begins.

In the intermediate corrections step 302 the second server receives the data corrections form from the web portal. Then the second server 110 converts the data into a form that can be utilized by the first server 104. After the data has been converted the intermediate corrections step 302 sends the data to the first server 104, and the first server 104 begins the data corrections step 304. In the data corrections step 304 the first server 104 accesses the original computer 100, 102 either directly through the internal network 106 or indirectly through a World Wide Web connection 108 and edits the original database to include the correct information.

The three steps utilized in the embodiment of FIG. 3 can be performed any time there is a data error. It is anticipated that other errors aside from those listed above could be corrected utilizing the same process. It is additionally anticipated that any number of physical configurations similar to the one shown in FIG. 1 could be used to perform the same process.

The process of the present application has been described using an embodiment with the physical construction of FIG. 1. A worker of ordinary skill in this art would recognize that certain modifications to both the process and the physical construction of FIG. 1 would come within the scope of this invention. For that reason, the following claims should be studied to determine the true scope and content of this invention.

What is claimed is:

1. A method for reporting and correcting computer errors comprising:
   detecting an error;
   sending information related to said error to a first server;
   said first server creating an error report;
   storing said error report on said first server;
   transmitting said error report to a web portal via a World Wide Web connection;
   notifying at least one designated user of said error report;
   providing an error correction user interface;
   accepting a corrections form submitted by said at least one designated user; and
   modifying a system of origin to correct said error pursuant to said corrections form.

2. The method of claim 1 comprising the additional steps of:
   forwarding said error report to a second server; and
   said second server formatting said error report for use with said web portal.

3. The method of claim 1 comprising the additional step of flagging said error report as viewed after a user has accessed said error report.

4. The method of claim 1 wherein said notification comprises sending an email message.

5. The method of claim 1 wherein said notification comprises sending an SMS message.

6. The method of claim 1 wherein said notification comprises sending a voice message.

7. The method of claim 1 comprising the additional step of assigning an error code to said error corresponding to the error type.

8. The method of claim 7 comprising the additional step of identifying at least one designated user corresponding to said error code from a list of possible users for notification.

9. The method of claim 1 wherein said notification comprises posting a notification to a World Wide Web based notification board and allowing each of said at least one designated users to access said notification board.

* * * * *